(12) United States Patent
Uchibayashi

US012451497B2

(10) Patent No.: US 12,451,497 B2
(45) Date of Patent: Oct. 21, 2025

(54) CELL, CELL STACK DEVICE, MODULE, AND MODULE HOUSING DEVICE

(71) Applicant: KYOCERA Corporation, Kyoto (JP)

(72) Inventor: Kei Uchibayashi, Aira (JP)

(73) Assignee: KYOCERA Corporation, Kyoto (JP)

( * ) Notice: Subject to any disclaimer, the term of this patent is extended or adjusted under 35 U.S.C. 154(b) by 546 days.

(21) Appl. No.: 17/921,602

(22) PCT Filed: Apr. 27, 2021

(86) PCT No.: PCT/JP2021/016862
§ 371 (c)(1),
(2) Date: Oct. 26, 2022

(87) PCT Pub. No.: WO2021/221078
PCT Pub. Date: Nov. 4, 2021

(65) Prior Publication Data
US 2023/0163324 A1    May 25, 2023

(30) Foreign Application Priority Data

Apr. 30, 2020  (JP) ................. 2020-080856

(51) Int. Cl.
*H01M 8/0258*   (2016.01)
*H01M 8/1226*   (2016.01)
*H01M 8/2475*   (2016.01)

(52) U.S. Cl.
CPC ....... *H01M 8/0258* (2013.01); *H01M 8/1226* (2013.01); *H01M 8/2475* (2013.01)

(58) Field of Classification Search
CPC ............. H01M 8/0258; H01M 8/1226; H01M 8/2475; Y02E 60/50
See application file for complete search history.

(56) References Cited

U.S. PATENT DOCUMENTS

2021/0218046 A1* 7/2021 Seno ................. H01M 8/243
2021/0296678 A1* 9/2021 Shinchi ............. H01M 8/2457

FOREIGN PATENT DOCUMENTS

| JP | H06-203866 | A | 7/1994 | |
| JP | H11-297341 | A | 10/1999 | |
| JP | 2015-162357 | A | 9/2015 | |
| JP | 2020-119660 | A | 8/2020 | |
| WO | WO-2019225235 | A1 * | 11/2019 | .......... H01M 8/2485 |
| WO | WO-2020022489 | A1 * | 1/2020 | .......... H01M 8/1226 |

\* cited by examiner

*Primary Examiner* — Muhammad S Siddiquee
(74) *Attorney, Agent, or Firm* — Procopio, Cory, Hargreaves & Savitch LLP

(57) ABSTRACT

A cell includes an element portion and a support substrate. The support substrate includes a gas-flow passage through which the reactive gas flows in a first direction, and supports the element portion. The element portion includes a first portion having a first length in a second direction intersecting the first direction, and a second portion located on a downstream side in the gas-flow passage relative to the first portion, the second portion having a second length in the second direction different from the first length in the second direction.

15 Claims, 13 Drawing Sheets

CELL, CELL STACK DEVICE, MODULE, AND MODULE HOUSING DEVICE

CROSS-REFERENCE TO RELATED APPLICATION(S)

This application is a national stage application of International Application No. PCT/JP2021/016862, filed on Apr. 27, 2021, which designates the United States, the entire contents of which are herein incorporated by reference, and which is based upon and claims the benefit of priority to Japanese Patent Application No. 2020-080856, filed on Apr. 30, 2020, the entire contents of which are herein incorporated by reference.

TECHNICAL FIELD

The present disclosure relates to a cell, a cell stack device, a module, and a module housing device.

BACKGROUND OF INVENTION

In recent years, various fuel cell stack devices each including a plurality of fuel cells have been proposed as next-generation energy. In this technology, the plurality of fuel cells are each a type of cell capable of obtaining electrical power by using, as a reactive gas, a fuel gas such as a hydrogen-containing gas, and an oxygen-containing gas such as air.

CITATION LIST

Patent Literature

Patent Document 1: JP 2015-162357 A

SUMMARY

A cell according to an aspect of an embodiment includes an element portion and a support substrate. The support substrate includes a gas-flow passage through which the reactive gas flows in a first direction, and supports the element portion. The element portion includes a first portion having a first length in a second direction intersecting the first direction, and a second portion located on a downstream side in the gas-flow passage relative to the first portion, the second portion having a second length in the second direction different from the first length in the second direction.

Also, a cell stack device of the present disclosure includes a cell stack including a plurality of the cells described above.

Further, a module of the present disclosure includes the cell stack device described above and a storage container in which the cell stack device is stored.

Additionally, a module housing device of the present disclosure includes the module described above, an auxiliary device for operating the module, and an external case that houses the module and the auxiliary device.

DESCRIPTION OF EMBODIMENTS

Hereinafter, embodiments of a cell, a cell stack device, a module, and a module housing device disclosed herein will be described in detail with reference to the accompanying drawings. The disclosure is not limited by the following embodiments.

Note that the drawings are schematic and that the dimensional relationships between elements, the proportions thereof, or the like may differ from actual dimensions and the like. Further, the dimensional relationships, proportions, or the like may differ between drawings.

First Embodiment

Configuration of Cell

First, with reference to FIGS. 1A to 1C, a solid oxide fuel cell will be described as an example of a cell according to a first embodiment.

Figure 1A:
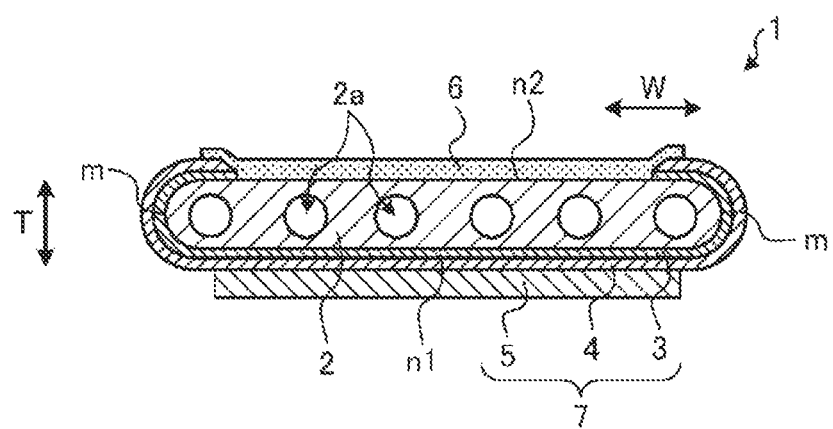
FIG. 1A is a horizontal cross-sectional view illustrating an example of a cell according to a first embodiment.
Figure 1B:
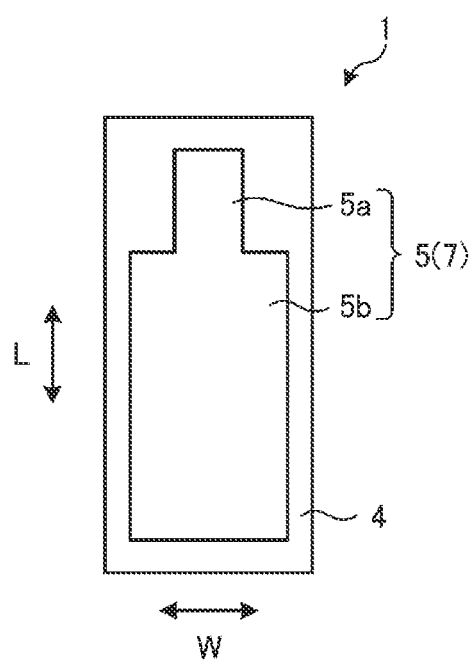
FIG. 1B is a side view illustrating an example of the cell according to the first embodiment when viewed from an air electrode side.
Figure 1C:
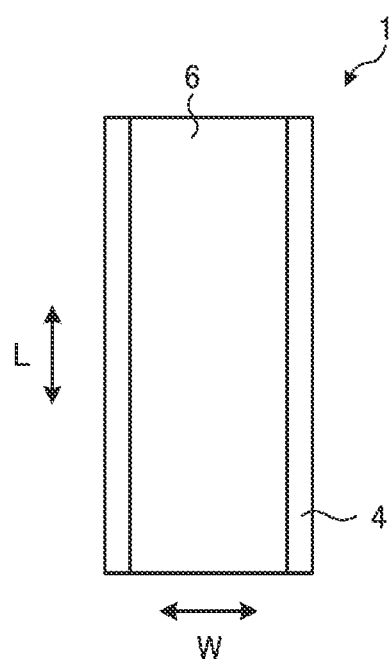
FIG. 1C is a side view illustrating an example of the cell according to the first embodiment when viewed from an interconnector side.

FIG. 1A is a horizontal cross-sectional view illustrating an example of a cell 1 according to the first embodiment, FIG. 1B is a side view illustrating an example of the cell 1 according to the first embodiment when viewed from an air electrode 5 side, and FIG. 1C is a side view illustrating an example of the cell 1 according to the first embodiment when viewed from an interconnector 6 side. Note that FIGS. 1A to 1C each illustrate an enlarged portion of a configuration of the cell 1.

In the example illustrated in FIGS. 1A to 1C, the cell 1 is hollow and flat plate-shaped, and has a long thin plate shape. As illustrated in FIG. 1B, the shape of the entire cell 1 when viewed from the side is a rectangle having a side length of, for example, 5 cm to 50 cm in a length direction L and a length of, for example, 1 cm to 10 cm in a width direction W orthogonal to the length direction L. The thickness of the entire cell 1 in a thickness direction T is, for example, 1 mm to 5 mm.

As illustrated in FIG. 1A, the cell 1 includes a support substrate 2 that is electrically conductive, an element portion 7, and the interconnector 6. The support substrate 2 has a pillar shape having a pair of flat surfaces n1 and n2 on opposite sides from each other, and a pair of arc-shaped side surfaces m connecting the flat surfaces n1 and n2.

The element portion 7 is located on the flat surface n1 of the support substrate 2. The element portion 7 includes a fuel electrode 3, a solid electrolyte layer 4, and the air electrode 5. Additionally, in the example illustrated in FIG. 1A, the interconnector 6 is located on the flat surface n2 of the cell 1.

Further, as illustrated in FIG. 1B, the air electrode 5 does not extend to the lower end or the upper end of the cell 1. At a lower end portion of the cell 1, only the solid electrolyte layer 4 is exposed to the surface. The shape of the air electrode 5 in a side view will be described later.

Furthermore, as illustrated in FIG. 1C, the interconnector 6 may extend to the lower end and the upper end of the cell 1. At the lower end portion of the cell 1, the interconnector 6 and the solid electrolyte layer 4 are exposed to the surface. Note that, as illustrated in FIG. 1A, the solid electrolyte layer 4 is exposed at the surfaces of the pair of arc-shaped side surfaces m of the cell 1. The interconnector 6 may not extend to the lower end of the cell 1.

Hereinafter, each constituent member constituting the cell 1 will be described.

The support substrate 2 includes gas-flow passages 2a through which a reactive gas flows. An example of the support substrate 2 illustrated in FIG. 1A includes six of the gas-flow passages 2a. The gas-flow passages 2a are located along the length direction L (see FIG. 1B) that intersects the width direction W The support substrate 2 has gas permeability, and allows the reactive gas flowing in the gas-flow passages 2a to permeate to the fuel electrode 3. The support substrate 2 may have electrical conductivity. The support substrate 2 having electrical conductivity causes electricity generated in the element portion to be collected in the interconnector 6.

The air electrode 5 includes portions 5a and 5b. The portion 5b is located on one end side of the cell 1 in the length direction L, and the portion 5a is located on the other end side in the length direction L. The portions 5a and 5b each have a predetermined length in the width direction W, and each extend in the length direction L.

In the example illustrated in FIG. 1B, the fuel gas as the reactive gas flows through the gas-flow passage 2a located along the length direction L from the one end side to the other end side of the cell 1. That is, the portion 5b is located on an upstream side in the gas-flow passage 2a through which the fuel gas flows, and the portion 5a is located on a downstream side in the gas-flow passage 2a.

Here, the element portion 7 refers to a portion where the fuel electrode 3 and the air electrode 5 overlap with each other with the solid electrolyte layer 4 interposed therebetween. That is, in the present embodiment, the element portion 7 viewed in plan view matches the portion where the air electrode 5 is located. In the element portion 7, heat is generated during power generation. The heat generation amount in the element portion 7 correlates to the power generation amount. Thus, when the length of the element portion 7 in the width direction W is made constant, the heat generation amount is approximately the same over the entire length direction L.

However, a portion of the heat generated at the one end side of the cell 1 is transmitted along the flow of the fuel gas to the other end side of the cell 1 on the downstream side in the gas-flow passage 2a, so that a temperature gradient tends to occur in the cell 1 along the length direction L. That is, the other end side of the cell 1 located on the downstream side in the gas-flow passage 2a is more likely to be higher in temperature than the one end side located on the upstream side. When a temperature gradient occurs in the cell 1, on the other end side where the temperature becomes high, the power generation amount and the heat generation amount are larger than that on the one end side and deterioration progresses further. Thus, there is a concern that the battery performance of the cell 1 will deteriorate.

Therefore, in the present embodiment, the length of the element portion 7 in the width direction W as the second direction differs between the upstream side and the downstream side in the length direction L as the first direction. In an embodiment, the air electrode 5 serving as a first electrode includes the portion 5b and the portion 5a, which is located on the downstream side in the gas-flow passage 2a relative to the portion 5b and has a smaller length in the width direction W as the second direction than the portion 5b. When a length of the element portion 7 corresponding to the portion 5b in the width direction W is defined as a first length, and a length of the element portion 7 corresponding to the portion 5a in the width direction W is defined as a second length, the second length is smaller than the first length.

This can reduce the to ten gradient in the cell 1 along the length direction L. Thus, according to the embodiment, a decrease in battery performance can be reduced.

The material of the support substrate 2 contains, for example, an iron group metal component and an inorganic oxide. For example, the iron group metal component may be Ni (nickel) and/or NiO. For example, the inorganic oxide may be a specific rare earth element oxide.

As the material of the fuel electrode 3, a commonly known material may be used. As the fuel electrode 3, porous electrically conductive ceramics, for example, ceramics that contain $ZrO_2$ in which calcium oxide, magnesium oxide, or a rare earth element oxide is solid-solved and Ni and/or NiO, may be used. As the rare earth element oxide, for example, $Y_2O_3$ or the like is used. Hereinafter, $ZrO_2$ in which calcium oxide, magnesium oxide, or a rare earth element oxide is solid-solved may be referred to as stabilized zirconia. Stabilized zirconia also includes partially stabilized zirconia.

The solid electrolyte layer 4 is an electrolyte and bridges ions between the fuel electrode 3 and the air electrode 5. At the same time, the solid electrolyte layer 4 has gas blocking properties, and reduces leakage of the fuel gas and the oxygen-containing gas.

The material of the solid electrolyte layer 4 may be, for example, $ZrO_2$ in which 3 mol % to 15 mol % of a rare earth element oxide is solid-solved. As the rare earth element oxide, for example, $Y_2O_3$ or the like is used. Note that another material may be used as the material of the solid electrolyte layer 4, as long as the material has the characteristic described above.

The material of the air electrode 5 is not particularly limited, as long as the material is commonly used for an air electrode. The material of the air electrode 5 may be, for example, an electrically conductive ceramic such as an $ABO_3$ type perovskite oxide.

The material of the air electrode 5 may be, for example, a composite oxide in which Sr and La coexist in an A site. Examples of such a composite oxide include $La_xSn_{1-x}Co_yFe_{1-y}O_3$, $La_xSr_{1-x}MnO_3$, $La_xSr_{1-x}FeO_3$, and $La_xSr_{1-x}CoO_3$. Here, x is 0<x<1, and y is 0<y<1.

Further, the air electrode 5 has gas permeability. The open porosity of the air electrode 5 may be, for example, 20% or more, and particularly may be in a range from 30% to 50%.

As the material of the interconnector 6, a lanthanum chromite-based perovskite-type oxide ($LaCrO_3$-based oxide), a lanthanum strontium titanium-based perovskite-type oxide ($LaSrTiO_3$-based oxide), or the like may be used. These materials have electrical conductivity, and are neither reduced nor oxidized even when in contact with a fuel gas such as a hydrogen-containing gas or an oxygen-containing gas such as air.

Further, the interconnector 6 is dense, and reduces the leakage of both the fuel gas flowing through the gas-flow passages 2a located inside the support substrate 2 and the oxygen-containing gas flowing outside the support substrate 2. The interconnector 6 may have a relative density of 93% or more, particularly 95% or more.

Configuration of Cell Stack Device

Figure 2A:
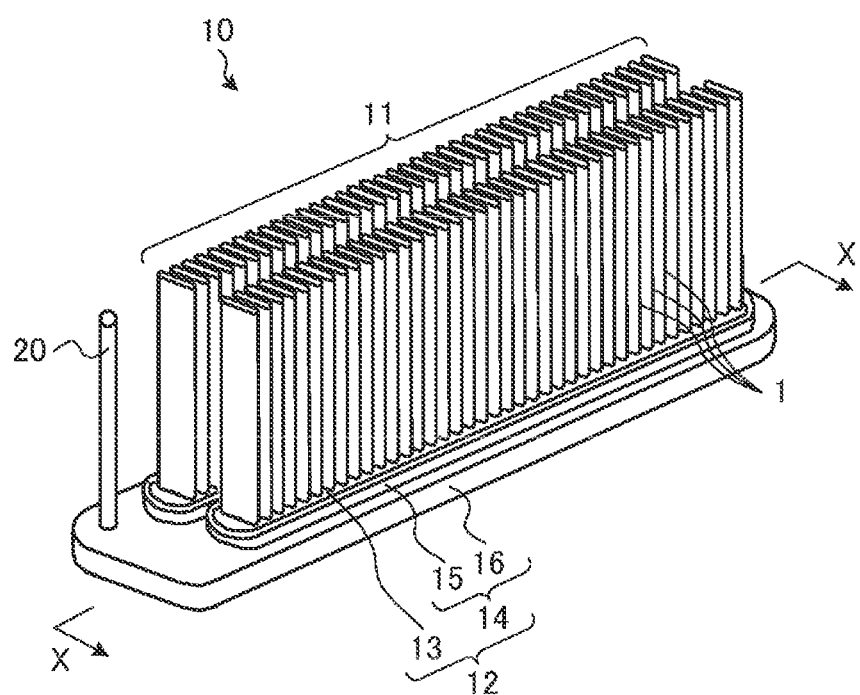
FIG. 2A is a perspective view illustrating an example of a cell stack device according to the first embodiment.

Next, a cell stack device 10 according to the present embodiment that uses the cell 1 described above will be described with reference to FIGS. 2A to 2C. FIG. 2A is a perspective view illustrating an example of the cell stack device 10 according to the first embodiment, FIG. 2B is a cross-sectional view taken along a line A-A illustrated in FIG. 2A, and FIG. 2C is a top view illustrating an example of the cell stack device 10 according to the first embodiment.

As illustrated in FIG. 2A, the cell stack device 10 includes a cell stack 11 that includes a plurality of the cells 1 arrayed (stacked) in the thickness direction T (see FIG. 1A) of the cell 1, and fixing members 12.

The fixing member 12 includes a bonding material 13 and a support member 14. The support member 14 supports the cells 1. The bonding material 13 bonds the cells 1 with the support member 14. Further, the support member 14 includes support bodies 15 and a gas tank 16. The support bodies 15 and the gas tank 16, as the support member 14, are made of metal and are electrically conductive.

Figure 2B:
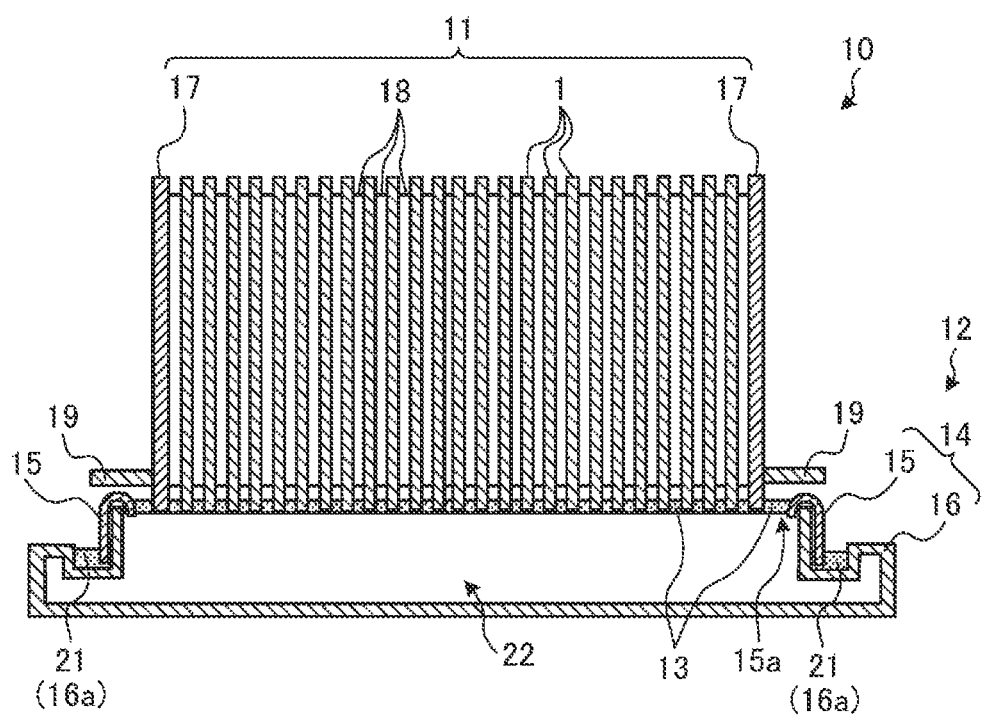
FIG. 2B is a cross-sectional view taken along a line X-X illustrated in FIG. 2A.
Figure 2C:
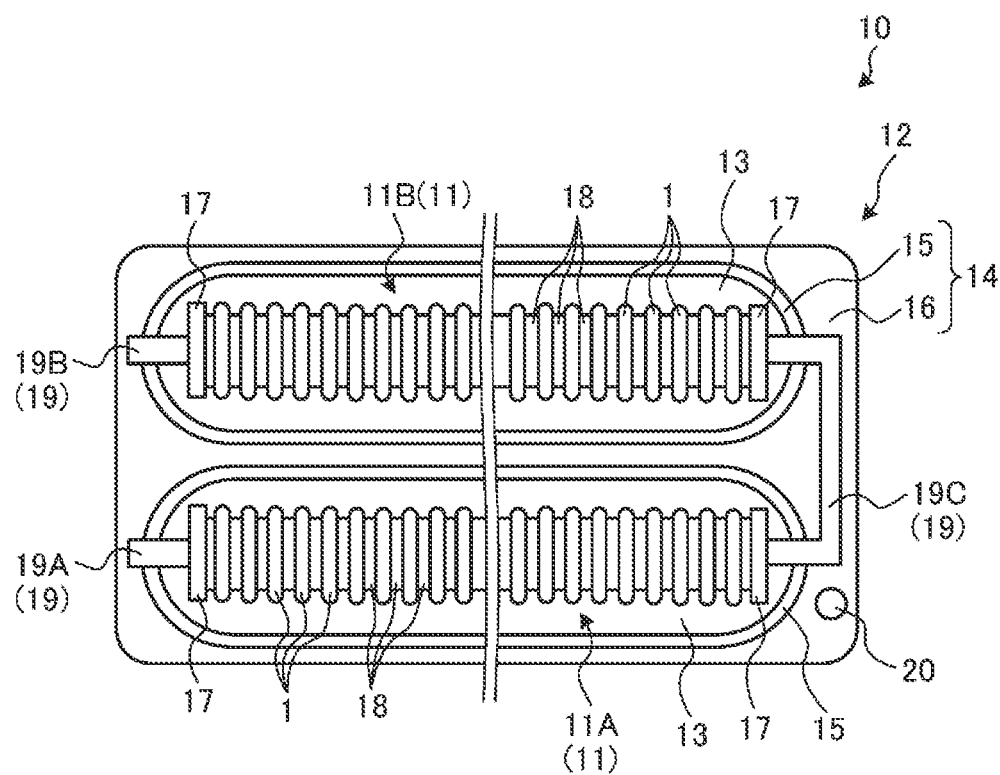
FIG. 2C is a top view illustrating an example of the cell stack device according to the first embodiment.

As illustrated in FIG. 2B, the support body 15 includes an insertion hole 15a into which the lower end portions of the plurality of cells 1 are inserted. The lower end portions of the plurality of cells 1 and an inner wall of the insertion hole 15a, are bonded by using the bonding material 13.

The gas tank 16 includes opening portions through which a reactive gas is supplied to the plurality of cells 1 via the insertion hole 15a, and recessed grooves 16a located around the opening portions. An outer peripheral end portion of each support body 15 is fixed to the gas tank 16 by a fixing material 21 filled in the recessed grooves 16a of the gas tank 16.

In the example illustrated in FIG. 2A, the fuel gas is stored in an internal space 22 formed by the support bodies 15 and the gas tank 16, which constitute the support member 14. The gas tank 16 includes a gas flow pipe 20 connected thereto. The fuel gas is supplied to the gas tank 16 through this gas flow pipe 20, and is supplied from the gas tank 16 to the gas-flow passages 2a (see FIG. 1A) inside the cell 1. The fuel gas supplied to the gas tank 16 is produced by a reformer 102 (see FIG. 4), which will be described below.

A hydrogen-rich fuel gas can be produced, for example, by steam reforming a raw fuel. When the fuel gas is produced by the steam reforming, the fuel gas contains water vapor.

In the example illustrated in FIG. 2A, two rows of the cell stacks 11 each including a plurality of the cells 1, two support bodies 15, and the gas tank 16 are provided. The two rows of cell stacks 11 each have a plurality of the cells 1. Each of the cell stacks 11 is fixed to a corresponding one of the support bodies 15. An upper surface of the gas tank 16 includes two through holes. Each of the support bodies 15 is disposed in a corresponding one of the through holes. The internal space 22 is formed by the one gas tank 16 and the two support bodies 15.

The insertion hole 15a has, for example, an oval shape in a top surface view. The length of the insertion hole 15a, for example, in an arrangement direction of the cells 1, that is, the thickness direction T of the cells 1, is greater than the distance between two end current collection members 17 located at two ends of the cell stack 11. The width of the insertion hole 15a is, for example, greater than the length of the cell 1 in the width direction W (see FIG. 1A). Note that the shape of the insertion hole 15a may be substantially rectangular in the arrangement direction of the cells 1.

As illustrated in FIG. 2B, the bonding material 13 is filled and solidified in a bonding portion between the inner wall of the insertion hole 15a and the lower end portions of the cells 1. As a result, the inner wall of the insertion hole 15a and the lower end portions of the plurality of cells 1 are bonded and fixed, and the lower end portions of the cells 1 are bonded and fixed to each other. The gas-flow passages 2a of each cell 1 communicate with the internal space 22 of the support member 14 at a lower end portion of the cell 1.

As the bonding material 13 and the fixing material 21, a material having low electrical conductivity such as glass can be used. As a specific material of the bonding material 13 and the fixing material 21, an amorphous glass or the like may be used, or particularly, a crystallized glass or the like may be used.

As the crystallized glass, for example, any of $SiO_2$—CaO-based, MgO—$B_2O_3$-based, $La_2O_3$—$B_2O_3$—MgO-based, $La_2O_3$—$B_2O_3$—ZnO-based, and $SiO_2$—CaO—ZnO-based materials may be used, or particularly, a $SiO_2$—MgO-based material may be used.

Further, as illustrated in FIG. 2B, electrically conductive members 18 are interposed between adjacent cells 1 of the plurality of cells 1. The electrically conductive member 18 electrically connects in series the fuel electrode 3 of one of the adjacent cells 1 with the air electrode 5 of the other of the adjacent cells 1. More specifically, the electrically conductive member 18 connects the interconnector 6 electrically connected to the fuel electrode 3 of one of the adjacent cells 1, and the air electrode 5 of the other of the adjacent cells 1.

Further, as illustrated in FIG. 2B, the end current collection members 17 are electrically connected to the cells 1 located at the outermost sides in the arrangement direction of the plurality of cells 1. The end current collection members 17 are each connected to an electrically conductive portion 19 protruding outward from the cell stack 11. The electrically conductive portion 19 collects electricity generated by power generation of the cells 1, and draws the electricity to the outside. Note that the end current collection members 17 are not illustrated in FIG. 2A.

Further, as illustrated in FIG. 2C, in the cell stack device 10, two cell stacks 11A and 11B, which are connected in series, function as one battery. Thus, the electrically conductive portion 19 of the cell stack device 10 is divided into a positive electrode terminal 19A, a negative electrode terminal 19B, and a connection terminal 19C.

The positive electrode terminal 19A functions as a positive electrode when the electrical power generated by the cell stack 11 is output to the outside, and is electrically connected to the end current collection member 17 on a positive electrode side in the cell stack 11A. The negative electrode terminal 19B functions as a negative electrode when the electrical power generated by the cell stack 11 is output to the outside, and is electrically connected to the end current collection member 17 on a negative electrode side in the cell stack 11B.

The connection terminal 19C electrically connects the end current collection member 17 on a negative electrode side in the cell stack 11A and the end current collector 17 on a positive electrode side in the cell stack 11B.

Variation

Figure 3:
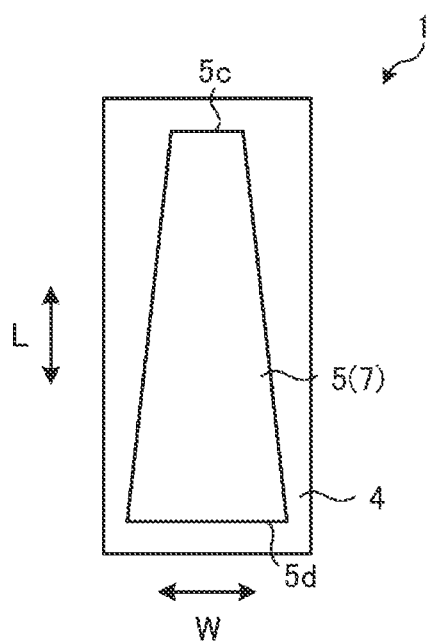
FIG. 3 is a side view illustrating an example of a cell according to a variation of the first embodiment when viewed from an air electrode side.

FIG. 3 is a side view illustrating an example of a cell according to a variation of the first embodiment when viewed from an air electrode side. As illustrated in FIG. 3, the air electrode 5 differs from the air electrode 5 according to the above-described embodiment in that the air electrode 5 has a substantially trapezoidal shape in which an end portion 5c on a downstream side in the gas-flow passage 2a (see FIG. 1A) through which the fuel gas flows has a length in the width direction W smaller than an end portion 5d on an upstream side. The end portion of the element portion 7, which is located on the upstream side in the gas-flow passage 2a and corresponds to the end portion 5d, corresponds to a first portion of the element portion 7 in the cell 1 according to the embodiment. The end portion of the element portion 7, which is located on the downstream side in the gas-flow passage 2a and corresponds to the end portion 5c, corresponds to a second portion of the element portion 7 in the cell 1 according to the embodiment. Additionally, when the length of the first portion in the width direction W is defined as a first length, and the length of the second portion in the width direction W is defined as a second length, the second length is smaller than the first length.

In this way, the temperature gradient along the length direction L of the cell 1 can also be reduced by continuously varying the length of the element portion 7 in the width direction W. Accordingly, the cell 1 according to the present variation can reduce a decrease in battery performance.

Note that in the cell 1 according to the above-described embodiment and the variation, the second portion of the element portion 7 is located at the end portion on the downstream side in the gas-flow passage 2a, but may be located in a region on the downstream side in the gas-flow passage 2a relative to the first portion.

Module

Figure 4:
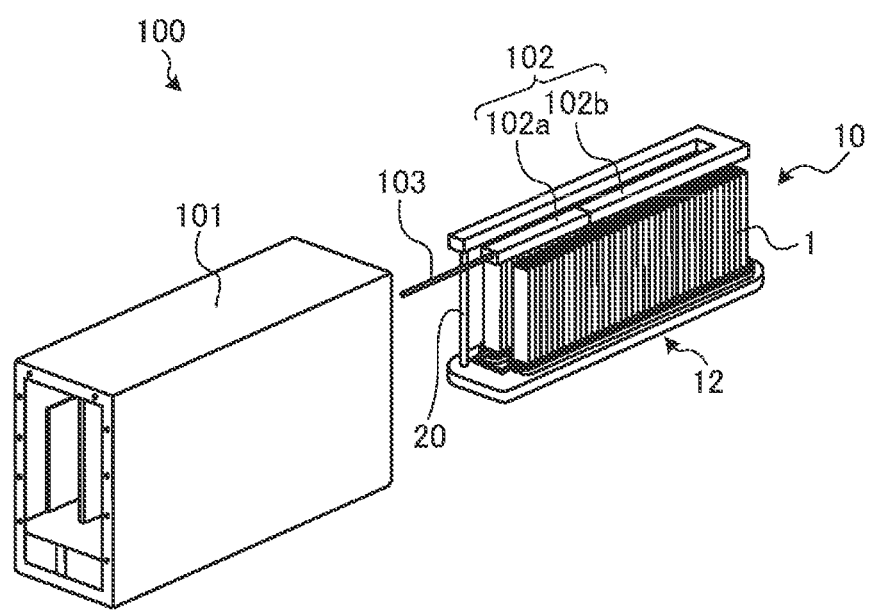
FIG. 4 is an exterior perspective view illustrating an example of the module according to the first embodiment.

Next, a module 100 according to the embodiment of the present disclosure in which the above-mentioned cell stack device 10 is used will be described with reference to FIG. 4. FIG. 4 is an exterior perspective view illustrating the module 100 according to the embodiment, and illustrates a state in which a front surface and a rear surface, which are portions of a storage container 101, are removed and the cell stack device 10, which is a fuel cell stored inside the module, is extracted to the rear.

As illustrated in FIG. 4, the module 100 includes the storage container 101 and the cell stack device 10 stored in the storage container 101. The reformer 102 is disposed above the cell stack device 10.

The reformer 102 generates a fuel gas by reforming a raw fuel such as natural gas or kerosene, and supplies the fuel gas to the cell 1. The raw fuel is supplied to the reformer 102 through a raw fuel supply pipe 103. The reformer 102 may include a vaporizing unit 102a for vaporizing water and a reforming unit 102b. The reforming unit 102b includes a reforming catalyst (not illustrated) for reforming the raw fuel into a fuel gas. The reformer 102 can perform steam reforming, which is a highly efficient reformation reaction.

Then, the fuel gas generated by the reformer 102 is supplied to the gas-flow passages 2a (see FIG. 1A) of the cell 1 through the gas flow pipe 20, the gas tank 16, and the support member 14.

Furthermore, in the module 100 having the above-mentioned configuration, the temperature in the module 100 during normal power generation is approximately from 500° C. to 1000° C. due to combustion of the gas and power generation by the cells 1.

With the module 100 having such a configuration, as mentioned above, the module 100 can be configured to suppress deterioration in battery performance by including the cell stack device 10 that reduces deterioration in battery performance.

Module Housing Device

Figure 5:
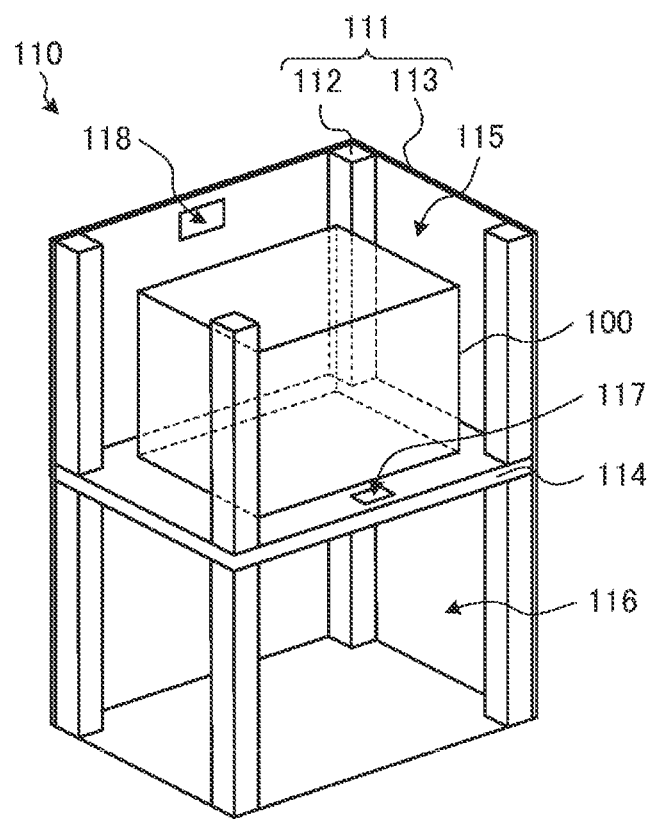
FIG. 5 is an exploded perspective view schematically illustrating an example of a module housing device according to the first embodiment.

FIG. 5 is an exploded perspective view illustrating an example of a module housing device according to the embodiment. A module housing device 110 according to the embodiment includes an external case 111, the module 100 illustrated in FIG. 4, and an auxiliary device (not illustrated). The auxiliary device operates the module 100. The module 100 and the auxiliary device are housed in the external case 111. Note that some of the configuration is not illustrated in FIG. 5.

The external case 111 of the module housing device 110 illustrated in FIG. 5 includes supports 112 and external plates 113, A dividing plate 114 vertically partitions the interior of the external case 111. The space above the dividing plate 114 in the external case 111 is a module housing chamber 115 in which the module 100 is housed, and the space below the dividing plate 114 in the external case 111 is an auxiliary device housing chamber 116 in which the auxiliary device configured to operate the module 100 is housed. Note that FIG. 5 does not illustrate the auxiliary device housed in the auxiliary device housing chamber 116.

Further, the dividing plate 114 includes an air flow communication opening 117 that causes air in the auxiliary device housing chamber 116 to flow into the module housing chamber 115 side. The external plate 113 constituting the module housing chamber 115 includes an exhaust opening 118 for exhausting the air inside the module housing chamber 115.

With the module housing device 110 having such a configuration, as described above, the module housing device 110 can reduce deterioration in battery performance by including, in the module housing chamber 115, the module 100 that reduces deterioration in battery performance.

Second Embodiment

Figure 6A:
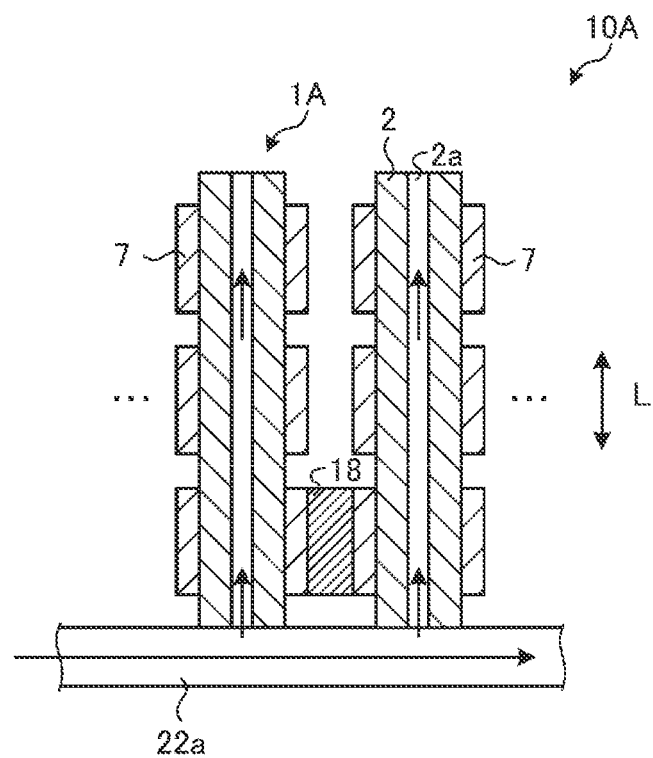
FIG. 6A is a cross-sectional view illustrating an example of a cell stack device according to a second embodiment.
Figure 6B:
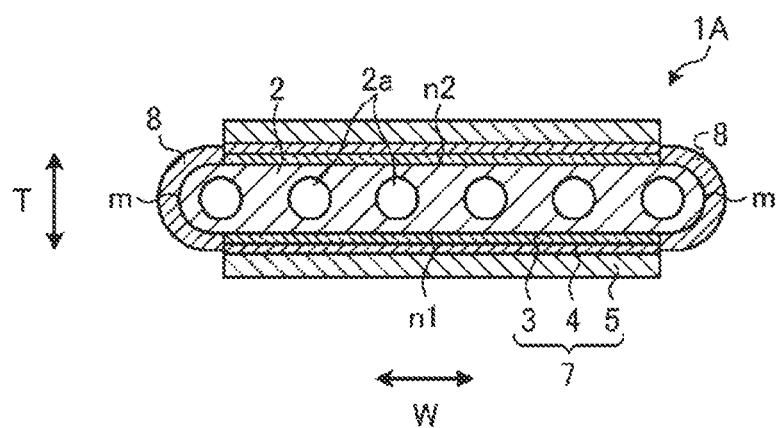
FIG. 6B is a horizontal cross-sectional view illustrating an example of a cell according to the second embodiment.
Figure 6C:
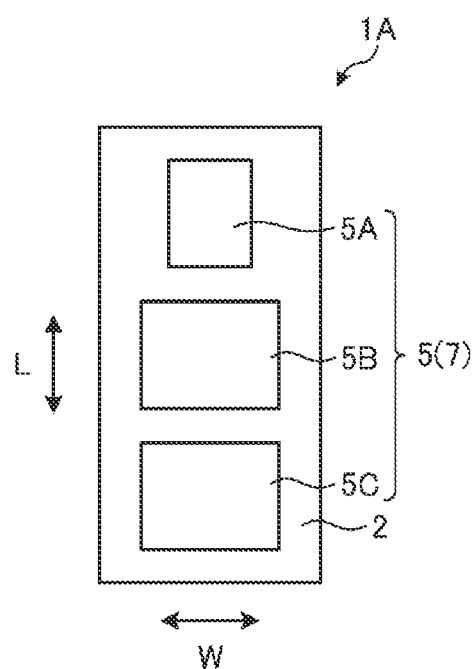
FIG. 6C is a side view illustrating an example of the cell according to the second embodiment when viewed from an air electrode side.

Subsequently, a cell stack device and a cell according to a second embodiment will be described with reference to FIGS. 6A to 6C, FIG. 6A is a cross-sectional view illustrating an example of the cell stack device according to the second embodiment. FIG. 6B is a horizontal cross-sectional view illustrating an example of the cell according to the second embodiment. FIG. 6C is a side view illustrating an example of the cell according to the second embodiment when viewed from an air electrode side.

As illustrated in FIG. 6A, in the cell stack device 10A according to the second embodiment, a plurality of support substrates 2, each supporting a plurality of the element portions 7, extend in the length direction L from a pipe 22a through which the fuel gas flows. This configuration constitutes each cell 1A. The gas-flow passage 2a through which gas flows from the pipe 22a is provided inside the support substrate 2 constituting each cell 1A. The cells 1A are connected in series to each other via the electrically conductive member 18.

As illustrated in FIG. 6B, the cell 1A includes the support substrate 2, a pair of the element portions 7, and sealing portions 8. The support substrate 2 has a pillar shape having a pair of flat surfaces n1 and n2 on opposite sides from each other, and a pair of arc-shaped side surfaces m connecting the flat surfaces n1 and n2.

The pair of element portions 7 are located facing each other on the flat surfaces n1 and n2 of the support substrate 2. Additionally, the sealing portions 8 are located in a manner to cover the side surfaces m of the support substrate 2.

As illustrated in FIG. 6C, the cell 1A includes a plurality of the air electrodes 5 on the flat surface side, for example. The plurality of air electrodes 5 include air electrodes 5A to 5C located along the length direction L of the cell 1A. Each of the air electrodes 5A to 5C constitutes each element of the element portion 7. The air electrode 5C is located on one end of the cell 1A in the length direction L, and the air electrode 5A is located on the other end in the length direction L. The air electrode 5B is located between the air electrodes 5A and 5C. The cell 1 may have a plurality of air electrodes on the flat surface n2 side as well as on the flat surface n1 side.

Furthermore, the fuel gas flows in the gas-flow passage 2a from one end side to the other end side of the cell 1A. As described above, in the cell 1A located on the downstream side in the gas-flow passage 2a, the temperature rises higher than on the upstream side, and there is a concern that battery performance is deteriorated due to this temperature gradient.

Accordingly, in the present embodiment, the length of the air electrode 5 in the width direction W located on the downstream side in the length direction L is reduced. In the embodiment, the length of the air electrode 5 serving as the first electrode in the width direction W is smaller in the element portion 7 located on the downstream side in the gas-flow passage 2a than in the element portion 7 located on the upstream side of the gas-flow passage 2a. Specifically, when the element portion 7 corresponding to the air electrode 5A located on the downstream side in the gas-flow passage 2a is defined as a second element and the element portion 7 corresponding to the air electrode 5C located on the upstream side in the gas-flow passage 2a relative to the air electrode 5A is defined as a first element, a second length of the second element in the width direction W is smaller than a first length of the first element in the width direction W.

This can reduce the temperature gradient in the cell 1 along the length direction L. Thus, according to the embodiment, a decrease in battery performance can be reduced.

In the example illustrated in FIG. 6C, a third length, which is the length in the width direction W of a third element corresponding to the air electrode 5B, is defined as the same as the first length, which is the length in the width direction W of the first element corresponding to air electrode 5C. However, the third length may be the same as the second length, for example.

Variation

Figure 7A:
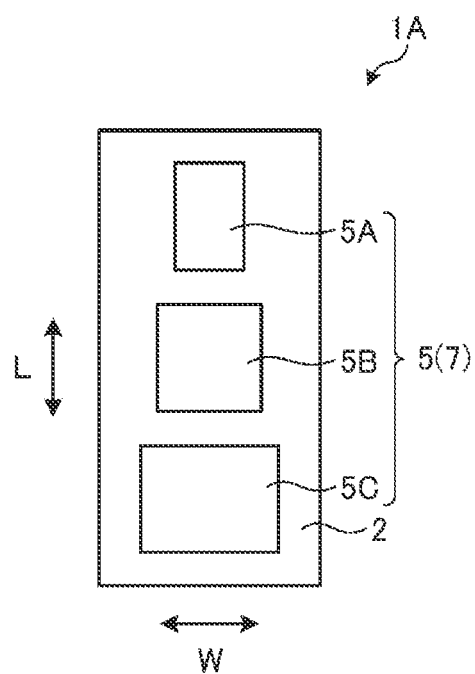
FIG. 7A is a side view illustrating an example of a cell according to a variation of the second embodiment when viewed from an air electrode side.
Figure 7B:
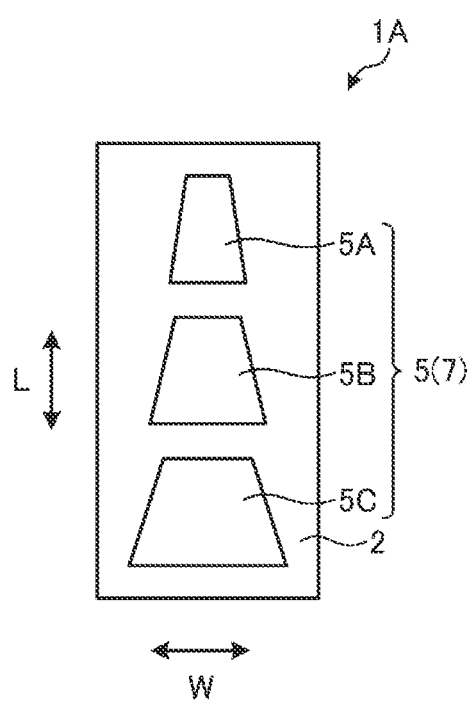
FIG. 7B is a side view illustrating another example of a cell according to a variation of the second embodiment when viewed from an air electrode side.

FIG. 7A is a side view illustrating an example of a cell according to a variation of the second embodiment when viewed from the air electrode side. FIG. 7B is a side view illustrating another example of a cell according to a variation of the second embodiment when viewed from an air electrode side.

The cell 1A illustrated in FIG. 7A differs from the cell 1A according to the above-described embodiment in that each element of the element portions 7 corresponding to the air electrodes 5A to 5C located along the length direction L has a different length in the width direction W. Specifically, the length in the width direction W of the element portion 7 corresponding to the air electrode 5 is smaller in the air electrode 5B than in the air electrode 5C located on the upstream side in the length direction L, and the length in the width direction W of the element portion 7 corresponding to the air electrode 5 is smaller in the air electrode 5A than in the air electrode 5B.

The cell 1A illustrated in FIG. 7B differs from the cell 1A illustrated in FIG. 7A in that each element of the element portions 7 corresponding to the air electrodes 5A to 5C has a substantially trapezoidal shape. In this shape, an end portion on the downstream side in the gas-flow passage 2a through which the fuel gas flows has a length in the width direction W smaller than that of an end portion on the upstream side. Specifically, the element portion 7 corresponding to the air electrode 5A located on the downstream side in the gas-flow passage 2a is defined as a second element, and the element portion 7 corresponding to the air electrode 5C located on the upstream side in the gas-flow passage 2a relative to the air electrode 5A is defined as a first element. An upstream end of the first element is a first portion having a first length in the width direction W, and a downstream end of the first element is a second portion having a second length smaller than the first length in the width direction W. An upstream end of the second element is a third portion having a third length in the width direction W, and a downstream end of the second element is a fourth portion having a fourth length smaller than the third length in the width direction W.

In this way, the temperature gradient along the length direction L of the cell 1 can be reduced even by continuously varying the length of the air electrode 5 in the width direction W. Accordingly, the cell 1 according to the present variation can reduce a decrease in battery performance.

In the examples illustrated in FIGS. 7A and 7B, the length in the width direction W of each element corresponding to each air electrode 5 is gradually changed from upstream to downstream in the gas-flow passage 2a, but no limitation is intended. For example, in FIG. 7A, the length in the width direction W of the element corresponding to the air electrode 5B may be larger than the length in the width direction W of the second element corresponding to the air electrode 5A, or may be smaller than the length in the width direction W of the first element corresponding to the air electrode 5C.

In FIG. 7B for example, at least one of the elements of the element portions 7 corresponding to the air electrodes 5A to 5C may have a substantially trapezoidal shape in plan view, as illustrated.

Other Variations

Subsequently, a cell stack device according to other variations of the embodiment will be described.

In the embodiments described above, a case where the hollow flat plate-shaped support substrate is used has been described as an example; however, the disclosure can also be applied to a cell stack device that uses a cylindrical support substrate.

Further, in the above-described embodiments, an example is illustrated in which the fuel electrode is provided on the support substrate and the air electrode is disposed on the surface of the cell. However, the disclosure can also be applied to an opposite arrangement, namely, to a cell stack device in which the air electrode is provided on the support substrate and the fuel electrode is disposed on the surface of the cell.

Further, in the above-described embodiment, the "cell", the "cell stack device", the "module", and the "module housing device" are exemplified by a fuel cell, a fuel cell stack device, a fuel cell module, and a fuel cell device, respectively. However, these components may also be exemplified by an electrolytic cell, an electrolytic cell stack device, an electrolytic module, and an electrolytic device, respectively.

While the present disclosure has been described in detail, the present disclosure is not limited to the above-mentioned embodiments, and various changes, improvements, or the like can be made without departing from the gist of the present disclosure.

As described above, the cell 1 according to the embodiment includes the element portion 7 and the support substrate 2. The support substrate 2 includes the gas-flow passages 2a through which the reactive gas flows in the first direction, and supports the element portion 7. The element portion 7 includes a first portion having a first length in a second direction intersecting the first direction, and a second portion located on a downstream side in the gas-flow passage 2a relative to the first portion and having a second length different from the first length, in the second direction. This can enhance the durability of the cell 1.

Also, the cell stack device 10 according to the embodiment includes a plurality of the cells described above. This can enhance the durability of the cell stack device 10.

Further, the module 100 according to the embodiment includes the cell stack device 10 described above, and the storage container 101 in which the cell stack device 10 is stored. As a result, the module 100 can be configured to reduce a deterioration in battery performance.

Further, the module housing device 110 according to the embodiment includes the module 100 described above, the auxiliary device for operating the module 100, and the external case that houses the module 100 and the auxiliary device. As a result, the module housing device 110 can be configured to reduce a deterioration in battery performance.

Note that the embodiments disclosed herein are exemplary in all respects and not restrictive. The above-described embodiments can be embodied in a variety of forms. Furthermore, the above-described embodiments may be omitted, replaced, or changed in various ways without departing from the scope of the appended claims and the gist thereof.

The invention claimed is:

1. A cell comprising:
a support substrate comprising a gas-flow passage through which a reactive gas flows in a first direction, the support substrate supporting an element portion,
the element portion comprising:
a first portion having a first length in a second direction intersecting the first direction; and
a second portion located on a downstream side in the gas-flow passage relative to the first portion, the second portion having a second length in the second direction different from the first length in the second direction.

2. The cell according to claim 1, wherein
the second length is smaller than the first length.

3. The cell according to claim 1, wherein
the first portion is an end portion, on an upstream side in the gas-flow passage, of the element portion.

4. The cell according to claim 1, wherein
the second portion is located in a region on the downstream side in the gas-flow passage.

5. The cell according to claim 4, wherein
the second portion is an end portion, on the downstream side in the gas-flow passage, of the element portion.

6. The cell according to claim 1, wherein
a length of the element portion in the second direction is smaller on the downstream side than on the upstream side in the gas-flow passage.

7. The cell according to claim 1, wherein
the element portion comprises:
a first element comprising the first portion; and
a second element comprising the second portion located on the downstream side in the gas-flow passage relative to the first element.

8. The cell according to claim 7, wherein
a length of the second element in the second direction is smaller than a length of the first element.

9. The cell according to claim 1, wherein
the element portion comprises:
a first element; and
a second element located on the downstream side in the gas-flow passage relative to the first element, and
the first element or the second element includes the first portion and the second portion.

10. The cell according to claim 9, wherein
the first portion is an end portion of the first element on an upstream side in the gas-flow passage, and
the second portion is an end portion of the first element on a downstream side in the gas-flow passage.

11. The cell according to claim 9, wherein
the first element comprises the first portion and the second portion, and
the second element comprises:
a third portion having a third length in the second direction; and
a fourth portion located on the downstream side in the gas-flow passage relative to the third portion and having a fourth length smaller than the third length in the second direction.

12. The cell according to claim 11, wherein
the fourth length is smaller than the second length.

13. A cell stack device, comprising a cell stack comprising a plurality of the cells according to claim 1.

14. A module comprising:
the cell stack device according to claim 13; and
a storage container in which the cell stack device is stored.

15. A module housing device, comprising:
the module according to claim 14;
an auxiliary device configured to operate the module; and
an external case in which the module and the auxiliary device are housed.

* * * * *